United States Patent

[11] 3,589,354

| [72] | Inventor | Sidney E. Cross |
| | | 416 East Mable St., Tucson, Ariz. 85705 |
| [21] | Appl. No. | 847,660 |
| [22] | Filed | Aug. 5, 1969 |
| [45] | Patented | June 29, 1971 |

[54] HEAT-RETAINING SUPPORT
18 Claims, 6 Drawing Figs.

[52] U.S. Cl. .................................. 126/275 R, 126/246
[51] Int. Cl. .................................. A47g 23/04, F24c 15/18
[50] Field of Search .................................. 126/246, 273.5, 275

[56] References Cited
UNITED STATES PATENTS
1,602,045  10/1926  Record .................. 126/275

| 2,152,924 | 4/1939 | Rutenber | 126/275 |
| 2,907,316 | 10/1959 | Windust | 126/275 X |

FOREIGN PATENTS
| 85,702 | 9/1920 | Switzerland | 126/246 |

*Primary Examiner*—Charles J. Myhre
*Attorneys*—Clarence A. O'Brien and Harvey B. Jacobson ABSTRACT: A storage rack comprising either an open platform or an enclosed platform for receiving and maintaining the temperature of precooked foods. The platform is formed of multiple layers, including a heat-insulating asbestos layer and an enlarged internal airflow space communicated with the exterior by underlying air tubes maintained above the support surface by a pair of depending legs. The covered platform includes surrounding asbestos-lined walls and a removable insulated cover.

PATENTED JUN29 1971

Sidney E. Cross
INVENTOR

BY *Clarence A. O'Brien*
and *Harvey B. Jacobson*
Attorneys

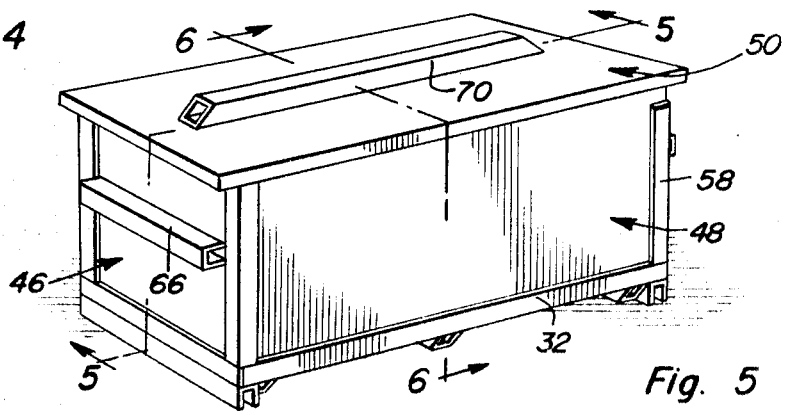
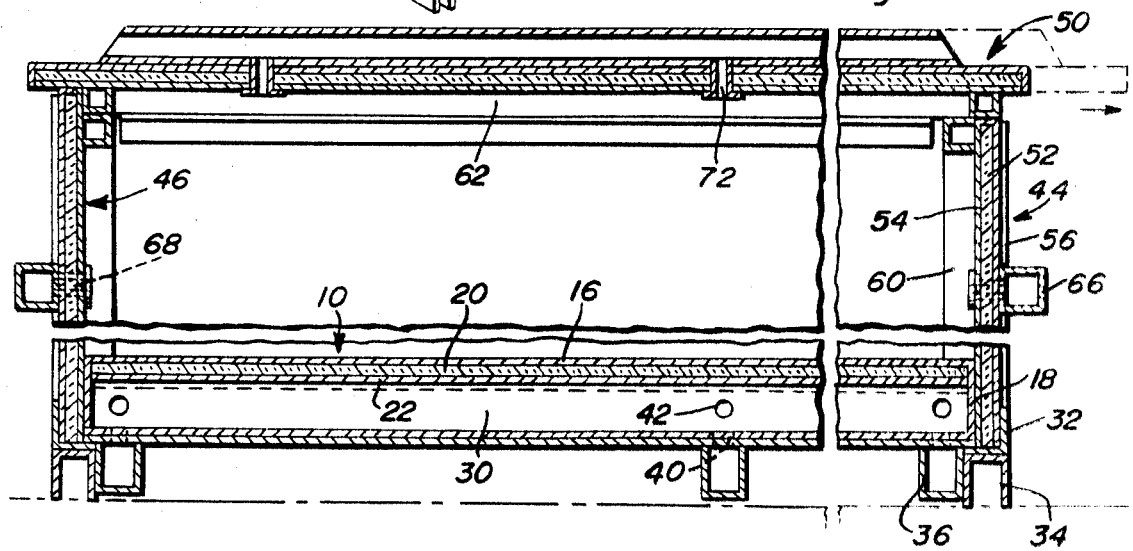
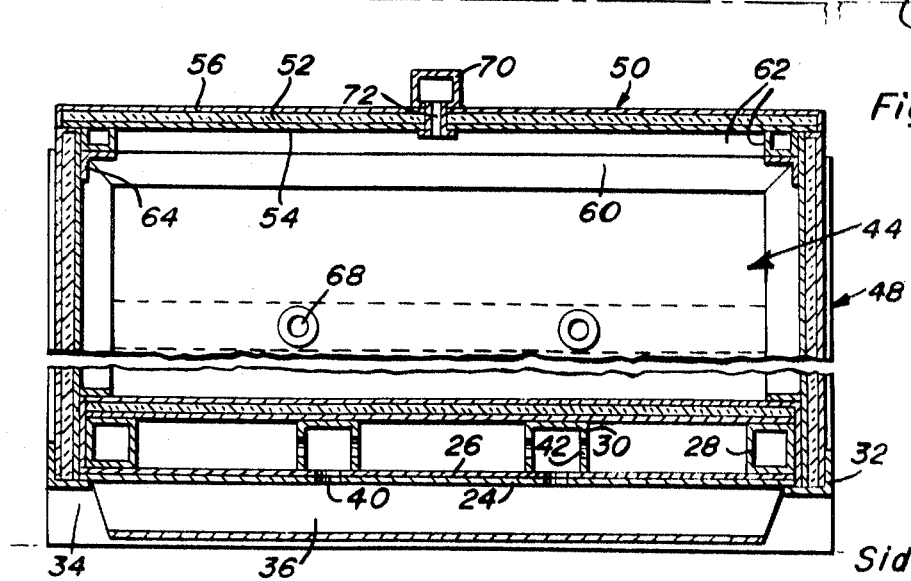

HEAT-RETAINING SUPPORT

The invention herein is generally related to food preparation, and more particularly involves the provision of means for maintaining cooked food in a heated and ready-to-serve condition for extended periods of time.

While also adapted for home use, the heat-retaining support of the instant invention will find particular utility in commercial food-serving establishments. Such establishments are normally provided with a cooking range including an enlarged flat grill top continuously heated so as to be immediately available for the preparation of food. The heat from such grill tops is normally too great to merely maintain precooked food in a warm and ready-to-serve condition. Accordingly, it is a primary object of the instant invention to provide a support for precooked foods which can be positioned on heated cooking grills whereby a regulation of the heat transmitted from the grill top to the container received foodstuffs on the support is effected. In other words, an insulated support is provided whereby the heat transfer from the heated grill is only sufficient so as to maintain the precooked food in a warm and ready-to-serve condition. By the same token, the support of the instant invention, whether it be in the form of an open platform or an enclosed platform, is equally adaptable for use on cold surfaces with the insulated construction acting so as to retain the initial heat of the cooked food for extended periods of time.

Basically, the construction of the instant invention includes a multilayer platform comprising stainless steel, aluminum, asbestos, and copper layers, along with an internal air space communicated with the exterior of the platform through appropriate vents and venting tubes. The platform can be exposed or enclosed within peripheral walls and a removable top, all internally insulated and appropriately vented.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 4 is a reduced perspective view of another form of a heat-retaining support wherein the basic platform is surrounded by an enclosure forming peripheral set of walls and a removable top;

FIG. 5 is an enlarged partial cross-sectional view taken substantially on a plane passing along line 5–5 in FIG. 4; and FIG. 6 is an enlarged cross-sectional view taken substantially on a plane passing along line 6–6 in FIG. 4.

Figure 1:
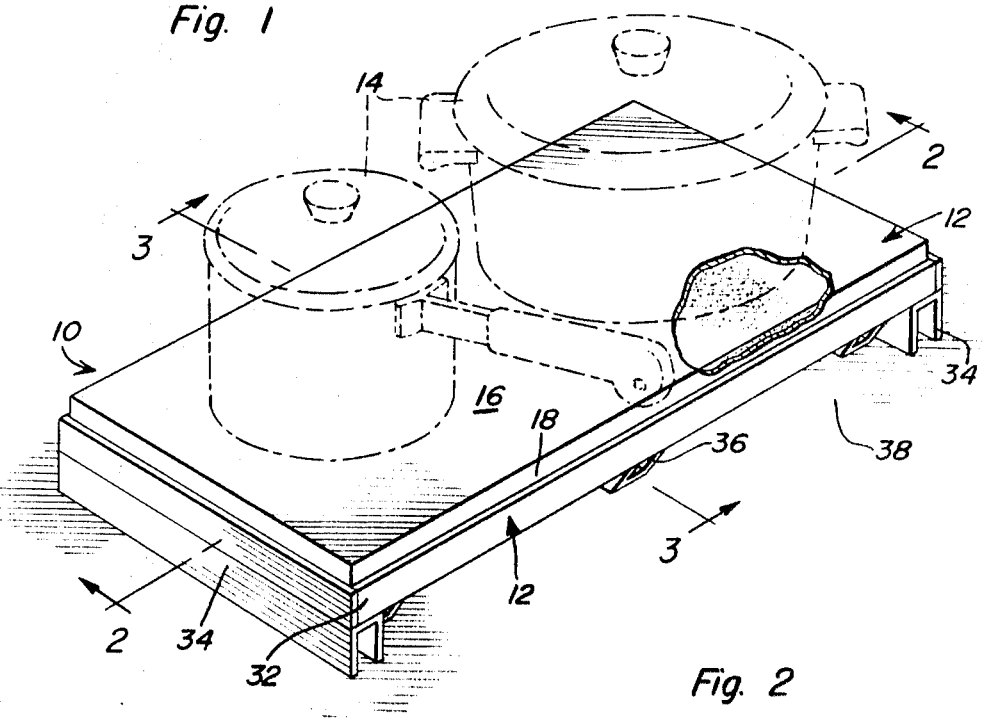
FIG. 1 is a perspective view of the heat-retaining support of the instant invention.

Referring now more specifically to the drawings, reference numeral 10 is used to generally designate the heat-retaining support of the instant invention. This support 10 includes an enlarged multilayer platform 12 for the support of appropriate precooked foodstuffs, normally in appropriate containers 14. The platform 12 includes a top surface forming layer or sheet 16 of stainless steel. This sheet 16 is provided with integral depending side flanges 18 peripherally thereabout. Immediately underlying the stainless steel top layer 16 is a layer of heat-insulating asbestos 20 contained within the peripheral flanges 18. The asbestos sheet or layer 20 is in turn directly underlaid by an aluminum sheet 22, the asbestos layer 20 being sandwiched between the layers 16 and 22 with the layers bonded together in any appropriate manner.

The bottom layer or sheet 24, formed preferably of copper, is provided in spaced relation below the asbestos underlying aluminum layer 22, and is substantially coextensive with the bottom edges of the peripheral flanges 18. This bottom layer 24 has an overlying aluminum layer 26 immediately thereagainst with the two contacting layers 24 and 26 being maintained in spaced relation below the upper aluminum layer 22 by a series of full length tubular members 28 and 30. The members 28 constitute the side members and extend along the opposed sides of the multilayer platform 12 immediately inward and adjacent to the side flanges. The tubular members 30, normally two being provided, extend longitudinally across the platform 12 at equally spaced points between the side tubular members 28. As will be appreciated from FIGS. 2 and 3, the peripheral edges of all of the layers engage against the peripheral flanges 18 so as to provide a closed unit. By the same token, the opposed ends of the space forming internal members 28 and 30 also engage against opposed portions of the peripheral flange 18.

The platform 12 is rigidified by peripherally orientated angle bars 32 receiving the lower peripheral edges of the platform 12 and overlying the flanges 18 to approximately midheight thereon and the adjacent edge portions of the bottom layer 24. The platform is supported and maintained in an elevated position by a pair of transversely extending full width legs 34. These legs 34 each consists of an inverted channel bar extending across one end portion of the platform 12 and having the bight portion thereof rigidly affixed to the horizontal leg of the corresponding edge reinforcing angle member 32. As will be appreciated, the spaced sides of each downwardly opening channel bar leg 34 result in the provision of what in effect constitutes four supports for the platform, thereby introducing a substantial degree of stability to the elevated platform.

A plurality of venting tubes or tubular members 36 are affixed to the undersurface of the bottom layer 24 and extend transversely across the platform, terminating in open beveled ends at the opposed edge members 32. Normally three such rectangular tubes 36 are provided, one adjacent each of the end legs 34 and one centrally located. These tubes 36 are of less height than the legs 34 so as to be vertically spaced above the support surface 38, normally a grill. At the point of underlying intersection with the internal central longitudinally extending tubular spacers 30, the three vent tubes 36 are communicated with the interior of the internal tubes 30 by vertical openings or holes 40 provided through the two lower sheets or layers 24 and 26. The internal tubes or tubular members 30 are in turn communicated with the internal platform air space by opposed holes 42 through the sides thereof. In this manner, the internal air space within the platform is communicated with the exterior through what might be considered a tortuous path whereby a regulated flow of heat from the heated supporting surface 38 can be introduced internally into the platform so as to maintain a limited heating thereof. By the same token, when the support 10 is utilized on an unheated surface, the interior of the platform will be vented so as to avoid any accumulation of moisture without having any appreciable effect on the insulating properties thereof.

Referring now to the embodiment of FIGS. 4—6, it will be appreciated that the same basic support 10 is utilized and enclosed within four peripherally orientated insulated walls, including first and second end walls 44 and 46, and opposed sidewalls 48. In addition, a removable insulated top 50 is also provided. The four walls and the top 50 are all constructed in basically the same manner, consisting of an internal asbestos layer 52 sandwiched between an inner stainless steel layer 54 and an outer aluminum layer 56.

Figure 2:
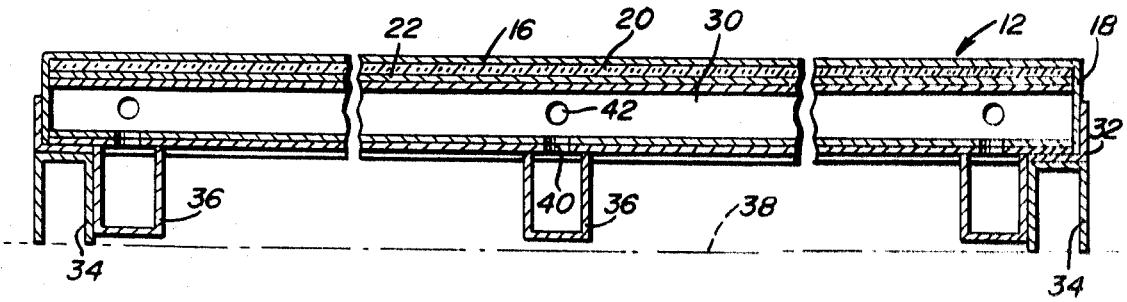
FIG. 2 is an enlarged partial cross-sectional view taken substantially on a plane passing along line 2–2 in FIG. 1.
Figure 3:
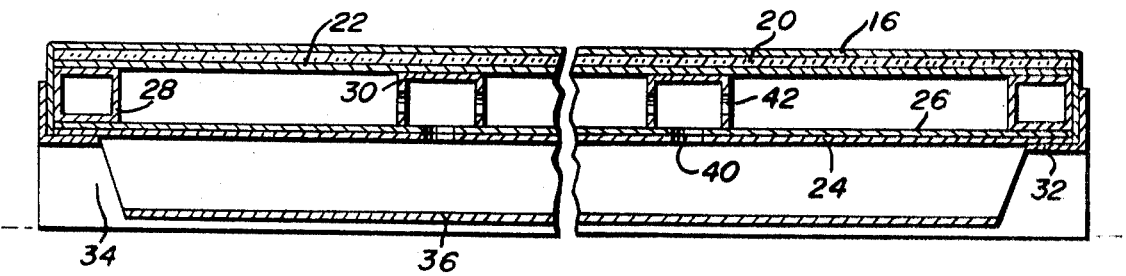
FIG. 3 is an enlarged partial cross-sectional view taken substantially on a plane passing along line 3–3 in FIG. 1.

The construction of the platform portion of the embodiment of FIGS. 4—6 differs from that illustrated in FIGS. 1—3 only in that the peripheral rigidifying angle members 32 are shifted slightly outward for the accommodation of the lower edge portions of the peripheral walls 44, 46 and 48 between these angle members 32, or at least the vertical flanges thereof, and the adjacent peripheral flanges 18 of the top support surface forming layer 16. In all other aspects, the support unit 10 is the same as that illustrated in FIGS. 1—3, and accordingly, like reference numerals have been used to designate like parts.

The vertical corners of the peripheral enclosure forming walls are braced and rigidified by vertical angle members 58 with the two end walls 44 and 46 being internally braced by tubular members 60 extending along the opposed vertical edges thereof and transversely thereacross adjacent the upper edges thereof. The two sidewalls 48 and the end wall 46 are of equal height, the second end wall 44 being slightly shorter so as to facilitate the sliding introduction and removal of the cover or top 50. This top 50 includes a depending tubular member 62 affixed to the undersurface thereof peripherally thereabout in inwardly spaced relation to the peripheral edges of the top 50. Incidentally, the entire unit will preferably be rectangular as illustrated, thereby utilizing a rectangular top with opposed parallel edges and opposed parallel ends.

The opposed sidewalls 48 are provided with a pair of angle member guides 64 affixed to the inner surfaces thereof at the same height as the end wall bracing tubular member cross portions, which in turn are below the upper edges of the walls 46 and 48 a distance equal to the height of the top braces 62. In addition, the side portions of the top braces 62 are located inwardly from the side edges of the top a distance sufficient so as to enable an overlapping of the side edge portions of the top 50 over the opposed sidewalls 48, as will be best appreciated from FIG. 6. Thus, the top 50 can be mounted and removed by sliding the top over the relatively shorter end wall 44 with the top brace members 62 seating on the opposed angle guide 64 for a guided sliding of the top until the rear transverse portion of the top brace member 62 engages against the upwardly projecting portion of the end wall 46. The top, positioned in this manner, effectively seals the unit with the top 50 itself seating on the upper edges of the two sidewalls 48 and the end wall 46, while the forward transverse portion of the top brace members 62 seats on the upper edge of the relatively shorter end wall 44.

In order to vent the interior of the enclosure, primarily for the purpose of removing excess moisture generated by the warmed foodstuffs, the two end walls 44 and 46 each have a vent tub 66 affixed transversely across the outer layer thereof, this vent tube opening at the opposite ends thereof to the atmosphere and being communicated with the interior of the enclosure by a pair of holes or ports 68 extending through each end wall 44 and 46. The top 50 is likewise vented to the atmosphere through the utilization of a longitudinally extending vent tube 70 having the opposed ends thereof open to the atmosphere and internally communicating with the interior of the enclosure by a pair of vents or openings 72 defined through the top 50. In addition to the end wall tubes 66 and top tube 70 functioning as vent tubes, it will be appreciated that such tubes provide and act as convenient handles for the carrying of the unit and the manipulation of the top.

From the foregoing, it will be appreciated that a unique heat-retaining device for precooked foods has been defined. This device, in the nature of a support, either with or without an enclosure thereabout, includes an elevated insulated platform having underlying tubular vents communicated with the hollow interior of the platform for the movement of air therethrough, primarily for the regulation of the heat within the platform so as to avoid an excess heat buildup when the support is positioned on a heated grill top or the like, air moving through the venting arrangement in effect regulating the heat within the platform. In the enclosure form of the invention, the peripheral walls and top are provided with moisture-removing vent construction including external tubular venting tubes which also function as handles.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What I claim as new is as follows:

1. A heat retainer for cooked foodstuffs comprising a flat multilayer platform including a top support layer, an asbestos layer immediately therebelow, and a bottom layer in spaced relation below said asbestos layer whereby an air space is defined internally within said platform, leg means depending from the bottom layer at laterally spaced points for maintaining the platform elevated, and vent means venting the internal platform air space to the atmosphere, said vent means including a series of tubular members affixed to the undersurface of the bottom layer and extending thereacross, said tubular members being open at the opposed ends thereof, and opening extending through the bottom layer and communicating the tubular members with the interior of the platform air space.

2. The construction of claim 1 wherein said tubular members are of a lesser height than said leg means and are hence maintained elevated above a supporting surface.

3. The construction of claim 2 including tubular members orientated within said platform air space and retaining the upper and lower layers in spaced relation so as to define said air space, said internal tubular members overlying the openings communicating the air space with the vent means tubular members and likewise including openings communicating with the internal air space.

4. The construction of claim 3 wherein said top platform layer includes peripherally orientated depending flanges enclosing said internal air space.

5. The construction of claim 4 wherein said top layer is metal, a second metal layer immediately underlying the asbestos layer and overlying the internal air space.

6. The construction of claim 4 including insulated peripherally orientated walls projecting upwardly from said platform.

7. The construction of claim 6 including a removable insulated top overlying said walls in parallel spaced relation above said platform whereby an enclosure is defined.

8. The construction of claim 7 including vent means through said walls and said top.

9. The construction of claim 8 wherein said wall and top vent means comprise external hollow elongated vent tubes, each of said tubes having open opposed ends, and openings defined through the walls and top in communication with the associated vent tubes.

10. The construction of claim 9 wherein the wall vent tubes are horizontally orientated and function as handles.

11. The construction of claim 10 including internal guides mounted on selective portions of the walls, one portion of said walls in alignment with said guides being lower than the remaining portions of said walls so as to allow a sliding introduction of said top thereover, said top including depending portions engageable with said internal wall mounted guides.

12. A heat retainer for cooked foodstuffs comprising a flat multilayer platform including a top support layer, an asbestos layer immediately therebelow, and a bottom layer in spaced relation below said asbestos layer whereby an air space is defined internally within said platform, leg means depending from the bottom layer at laterally spaced points for maintaining the platform elevated, vent means venting the internal platform air space to the atmosphere, insulated peripherally orientated walls projecting upwardly from said platform, an insulated top over said walls, and vent means through said walls and said top, said wall and top vent means comprising external hollow elongated vent tubes, each of said tubes having open opposed ends, and openings defined through the walls and top in communication with the associated vent tubes, the wall vent tubes being horizontally orientated and functioning as handles.

13. The construction of claim 12 including tubular members orientated within said platform air space and retaining the upper and lower layers in spaced relation so as to define said air space, said internal tubular members including openings communicating with the internal air space and being in communication with said vent means.

14. A heat retainer for cooked foodstuffs comprising a flat multilayer platform including a top support layer, a layer of heat-insulating material immediately therebelow, and a bottom layer in spaced relation below said heat-insulating material layer whereby an air space is defined internally within said platform, leg means depending from the platform at spaced points for maintaining the platform elevated, vent means venting the internal platform air space to the atmosphere, said vent means including openings extending through the bottom layer, and tubular members orientated within said platform air space and retaining the upper and lower layers in spaced relation so as to define said air space, said internal tubular members including openings communicating with the internal air space.

15. The construction of claim 14 including vent means through selected ones of said walls and said top, said wall and top vent means comprising external hollow elongated vent tubes, each of said tubes having open opposed ends, and openings defined through the walls and top in communication with the associated vent tubes.

16. The construction of claim 15 wherein said wall vent tubes are horizontally orientated and function as handles.

17. A heat retainer for cooked foodstuffs comprising a multilayer platform including a top support layer, a layer of heat-insulating material immediately therebelow, and a bottom layer in spaced relation below said heat-insulating material layer whereby an air space is defined internally within said platform, vent means venting the internal platform air space to the atmosphere, and vent means through selected ones of said walls and said top, said wall and top vent means comprising external hollow elongated vent tubes, each of said tubes having open opposed ends, and openings defined through the walls and top in communication with the associated vent tubes.

18. The construction of claim 17 wherein the wall vent tubes are horizontally orientated and function as handles.